United States Patent [19]

Klok et al.

[11] Patent Number: 5,230,439
[45] Date of Patent: Jul. 27, 1993

[54] CONTAINER HAVING THEREIN MEANS FOR DETECTING LEVELS OF LIQUID

[75] Inventors: Cornelis Klok, Noiseau; Daniel Delatte, Saint Maur, both of France

[73] Assignee: L'Air Liquide, Societe Anonyme Pour L'Etude et L'Exploitation des Procedes Georges Claude, Paris, France

[21] Appl. No.: 931,332

[22] Filed: Aug. 18, 1992

[30] Foreign Application Priority Data

Aug. 30, 1991 [FR] France ................. 91 10782

[51] Int. Cl.⁵ ............................. B65D 90/04
[52] U.S. Cl. ............................ 220/420; 220/901
[58] Field of Search .......... 220/420, 565, 901; 206/443; 73/304 C; 324/72, 72.5, 658

[56] References Cited

U.S. PATENT DOCUMENTS

| | | |
|---|---|---|
| 3,119,238 | 1/1964 | Chamberlain et al. ......... 220/420 X |
| 3,167,695 | 1/1965 | Bronson . |
| 4,332,167 | 6/1982 | Sun et al. ..................... 73/304 C |
| 4,399,699 | 8/1983 | Fujishiro ....................... 73/304 C |
| 4,572,402 | 2/1986 | Gervais et al. ................. 220/901 X |
| 4,674,289 | 6/1987 | Andonian ...................... 220/901 X |
| 4,841,969 | 6/1989 | Donnerhack et al. .......... 220/901 X |

FOREIGN PATENT DOCUMENTS

| | | |
|---|---|---|
| 1162975 | 9/1958 | France . |
| 1188282 | 9/1959 | France . |
| 792484 | 3/1958 | United Kingdom . |

Primary Examiner—Steven M. Pollard
Attorney, Agent, or Firm—Young & Thompson

[57] ABSTRACT

The container includes a shell defining an interior volume and including a main part, peripherally bound by a portion of a main partition and an end part defining a duct giving access to the interior volume, the transverse dimensions of the duct being smaller than those of the main part and being closable by a shutter, and a level detector typically of the capacitive type, permanently disposed in the shell on at least one zone of the portion of the main partition, and connected to an outside box for the treatment of a signal of the detector. Application for example to cryogenic containers.

7 Claims, 1 Drawing Sheet

CONTAINER HAVING THEREIN MEANS FOR DETECTING LEVELS OF LIQUID

BACKGROUND OF INVENTION (a) Field of the Invention

The present invention concerns a container, of the type including at least one shell defining interior volume, the shell including a main part to contain at, least one liquid, peripherally bound by an outer wall, and an end part defining a duct giving access to the interior volume and whose transverse dimensions are smaller than those of the main part, removable shutter means to close the access duct, and level detecting means providing a signal which is representative of a level of liquid in the main part of the shell.

The present invention concerns any type of liquid container with a coefficient of electrical conductivity which differs from that of the gaseous atmosphere above the liquid in the shell of the container and requiring an access to the interior volume of the container, and more particularly cryogenic liquids, for example, although not exclusively, for the storage of biological products in a cryogenic liquid, such as liquid nitrogen.

(b) Description of Prior Art

It has also been proposed to provide mechanical or electrical means, which can detect a level, and are in the shape of a rod extending into the shell through the access duct. This technology however has the disadvantage of requiring the detecting means to be removed to free the access to the interior volume, even if only to fill the shell. The fact that the detecting means can be removed creates problems of installation and calibration and, in particular, in cryogenic containers, problems of trapping humidity which frequently causes interruptions of the detecting means when they are reintroduced into the cold enclosure. In the field of cryogenic containers for biological products, it has on the other hand been proposed to provide ultra-sonic protecting means which are carried by the shutter means, according to an approach which is costly and however not very reliable.

SUMMARY OF INVENTION

It is an object of the invention to propose a container provided with detecting means according to a simple and reliable arrangement, of low manufacturing and mounting costs, permanently giving free access to the interior volume without interfering with the products which are to be disposed therein.

For this purpose, according to a characteristic of the invention, the outer wall is substantially cylindrical, and the detecting means are of the capacitive type and comprise at least one electrode mounted in the main partition adjacent a portion of the outer wall, the electrode consisting of an elongated blade extending in a direction parallel to a generatrix line of the adjacent portion of the outer wall and presenting, in transverse cross-section, a shape of an arc which is of a circle substantially concentric to the adjacent portion of the main partition.

According to a more specific characteristic of the invention, the shell is metallic and constitutes one of the electrodes of the detecting means.

With such an arrangement, the detecting means are permanently mounted at the plant and are located in a "neutral" zone of the interior volume of the shell, offset with respect to the duct or access collar, by occupying only a minimum volume in the latter, not interfering with the product to be placed in the shell and without obstructing nor cluttering the access duct.

BRIEF DESCRIPTION OF DRAWINGS

Other characteristics and advantages of the present invention will appear from the description which follows of an embodiment, given by way of illustration but without limitation, with reference to the annexed drawings, in which.

DESCRIPTION OF PREFERRED EMBODIMENTS

Figure 1:
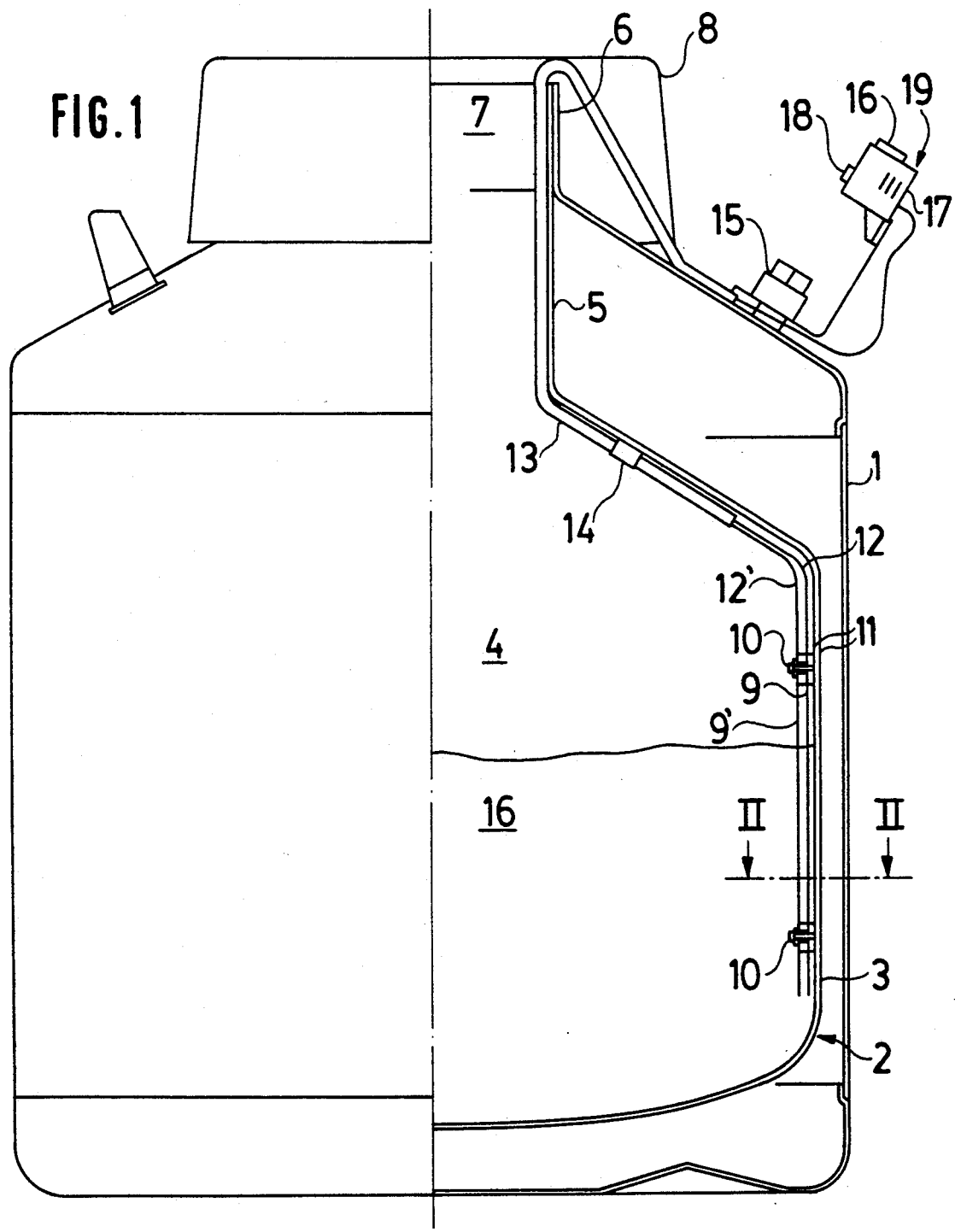
FIG. 1 is a schematic view, partially in longitudinal cross-section, of a cryogenic container according to the invention.

FIG. 1 represents, by way of illustration but without limitation, a transportable cryogenic container including in known manner an exterior shell 1 and an interior shell 2, the space between the two shells 1 and 2 being under vacuum and/or filled with a heat insulating material. Shell 2, typically made of a metal such as steel or aluminum, includes a lower main part peripherally bound by a portion of cylindrical main part 3 and defining an interior storage volume 4, the interior shell 2 including, at its upper end, a collar portion of reduced diameter 5 to which is connected an end collar portion 6 of the exterior shell 1 and defining an access duct 7 to the interior volume 4 which is closable by a removable shutter cap 8.

According to the present invention, along a generatrix line of the portion of the main part 3 of the interior shell 2 are provided at least one, typically two elongated parallel electrodes, 9, 9', for example of aluminum or copper, which are kept spaced from one another and from part 3, parallel to a generatrix line, by means of assembling pins 10 welded on the partition 3, and spacer washers 11 made of a non-conductive material, for example a plastic material. The electrodes are made of conductive wires 12, 12' which run along the wall of shell 3 in a wire conduit 13 which is held against the wall through a clamp 14 and extend along the wall of neck 5 then, fold down on the outer wall of the exterior shell 1, the conductors 12 and 12' extending outside cap 8, until reaching a reading box 19 fixedly mounted on the exterior shell 1, for example by means of clamp 15 which is used to provide a vacuum within the space between the two shells 1 and 2 and defines the electrical connection between the electronic circuits of the box 19 and the interior shell 2.

According to an aspect of the invention, the reading box 19, supplied by an electrical battery, includes electronics means for digital treatment of the signal provided by the electrodes 12 and 12' as a function of the level of liquid 16 present in the internal shell 3, this level being displayed on a level indicator 16. Box 19 additionally includes a sound indicator 17 which gives a sound signal when the level of the liquid in shell 2 reaches a given minimum threshold, and advantageously an interface connector 18 which can be connected to a box of a system for filling the container, operated via collar 7, so as to control the filling device as a function of the level which is read in real time by the electrodes 9, 9' via box 19.

Figure 2:
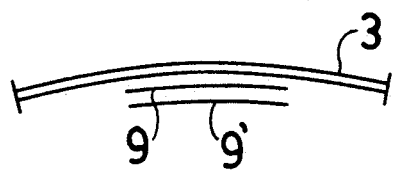
FIG. 2 is a partial transverse cross-section view according to line II—II of FIG. 1.

To increase the sensitivity of the detecting means, as illustrated in FIG. 2, the electrodes 9 and 9' advantageously appear, in transverse cross-section, in the shape of arcs of circle which are concentric to the wall 3 of shell 2.

When applied to cryogenic containers for biological products, also called "cryopreservers", the electrodes 9 and 9' will be mounted in one of the dead zones between two storage baskets which are placed adjacent one another in the main part of shell 2.

In applications to stationary cryogenic storage containers, the conductor threads 12 and 12' could sealingly pass through shells 2 and 1, for example in a wire conduit provided in the lower part of the storage container, reading box 19 being advantageously mounted also at the base of the storage container and being connected to a central station for controlling the distribution of gas, for example by telemonitoring.

Although the present invention has been described with reference to a specific embodiment, it is not limited thereto but on the contrary it is capable of modifications and variants which will appear to one skilled in the art.

We claim:

1. Container, including at least one shell defining an inner volume, the shell including a main part having an outer wall to contain at least one liquid, and an end part defining a duct giving access to the inner volume and whose transverse dimensions are smaller than those of the main part, removable closing means for closing the access duct, and level detecting means providing a signal indicative of a level of liquid in the main part of the shell, wherein the outer wall is substantially cylindrical, and the detecting means are of the capacitative type and comprise at least one electrode mounted in the main part adjacent a portion of the outer wall, the electrode consisting of an elongated blade extending substantially parallel to a generatrix line of the adjacent portion of the outer wall and having, in transverse cross section, the shape of an arc of a circle substantially concentric to the adjacent portion of the adjacent main part.

2. Container according to claim 1, wherein the shell is made of an electrically conducting metal and constitutes an electrode of the detecting means.

3. Container. according to claim 1, wherein the detecting means comprise two parallel electrodes spaced from one another and from the adjacent portion of the adjacent main part.

4. Container according to claim 1, further including a signal box for treating a signal from the detecting means, said signal box being mounted on the container.

5. Container according to claim 4, wherein the signal box is connected to the detecting means by at least one conductive wire passing through the access duct and extending outside the closing means.

6. Container according to claim 4, wherein the signal box includes a visual indicator of the level of liquid in the shell.

7. Container according to claim 1, further comprising an exterior shell surrounding the shell defining the inner volume, said shells defining an annular space therebetween.

* * * * *